United States Patent [19]

George et al.

[11] Patent Number: 4,684,870

[45] Date of Patent: Aug. 4, 1987

[54] TRANSCEIVER BATTERY CHARGING APPARATUS AND METHOD

[75] Inventors: David L. George, Indianapolis; Raymond G. Benson, Jr., Plainfield, both of Ind.

[73] Assignee: Uniden Corp. of America, Indianapolis, Ind.

[21] Appl. No.: 849,767

[22] Filed: Apr. 9, 1986

[51] Int. Cl.[4] ............................................... H02J 7/00
[52] U.S. Cl. ........................................ 320/20; 320/2; 320/23
[58] Field of Search ............... 320/2, 20, 22, 23, 54; 455/89, 95, 127, 343; 179/2 BC

[56] References Cited

U.S. PATENT DOCUMENTS

| | | | |
|---|---|---|---|
| 3,852,652 | 12/1974 | Jasinski | 320/35 |
| 3,962,591 | 6/1976 | Popka | 363/60 X |
| 4,095,184 | 6/1978 | Hochstein et al. | 455/127 |
| 4,281,377 | 7/1981 | Evans | 363/63 |
| 4,290,002 | 9/1981 | Piotti | 320/20 |

OTHER PUBLICATIONS

Pawson, Ian, "Battery Charger for Portable Video", Television, Jan. 1980, vol. 30, No. 3, pp. 142-143.

Primary Examiner—Patrick R. Salce
Assistant Examiner—Anita M. Ault
Attorney, Agent, or Firm—Woodard, Weikart, Emhardt & Naughton

[57] ABSTRACT

An apparatus and method for recharging a rechargeable battery in a hand-held transceiver while maintaining communications capability through the transceiver. The battery charger is housed in a charging unit to which the transceiver can be removably attached. A dual-mode charging circuit generates a first voltage during transmit mode and a second, higher voltage during receive mode, and includes a DC-DC converter for generating the second voltage. The charger includes a push-to-talk (PTT) switch and mode control circuitry for simultaneously controlling the operating modes of the charger and transceiver, and additionally includes a separate microphone, speaker, and audio and RF amplifiers for providing greater RF power and audio power while the transceiver battery is being recharged.

27 Claims, 3 Drawing Figures 4,684,870

TRANSCEIVER BATTERY CHARGING APPARATUS AND METHOD

BACKGROUND OF THE INVENTION

This invention relates to battery chargers, and particularly to battery chargers for transceivers having rechargeable batteries.

Portable transceivers are conventionally powered by a rechargeable battery which requires periodic recharging due to normal transceiver use, particularly due to the current drain on the battery from the RF power amplifier stages in the transmitter section of the transceiver. Conventionally the battery must be removed each time it is to be recharged. Unless a substitute battery is available, this approach renders the transceiver inoperable during the battery recharging period.

Several examples of battery chargers and charging techniques are shown in U.S. Pat. Nos. 4,290,002 to Piotti and 3,852,652 to Jasinski, and in Pawson, Ian, "Battery Charger for Portable Video," Television, January, 1980, Vol. 30, No. 3, pp. 142-3. Piotti discloses a method for controlling the recharging operation involving continual monitoring of the state of charge of the battery. Jasinski discloses a rapid battery charging system in which the battery charging rate is adjusted as a function of the rate of change of the internal temperature of the battery. The article by Pawson discloses a transformerless oscillator-driven DC-DC convertor for charging a 12-volt battery from a car battery.

Additional disclosures of possible relevance to this invention are found in U.S. Pat. Nos. 3,962,591 to Popka and 4,281,377 to Evans. Popka discloses a voltage doubler which uses only resistive, capacitive and semiconductive components. Evans discloses a power supply circuit which uses an operational amplifier oscillator, a buffer amplifier and a diode pump to derive a negative output voltage relative to the chassis ground of a vehicle from the vehicle battery.

SUMMARY OF THE INVENTION

The present invention provides a battery charger for a hand-held transceiver having a chargeable battery, comprising mode control means for controlling the operating mode of the battery charger in correspondence with the operating mode of the transceiver for transmit and receive modes, with the mode control means including means for detecting the state of the mode switch. The battery charger further includes charging circuit means for selectively charging the transceiver battery from a source of a first voltage during transmit mode and the source of a second, higher voltage during receive mode.

A battery charger according to another aspect of the invention enhances the operational capabilities of a hand-held transceiver by charging the transceiver battery while the transceiver is in use and also providing greater RF power for an effective increase in transceiver range. The battery charger includes a housing having means for receiving the transceiver, which when received is also electrically connected to the battery charger through a plurality of connector terminals provided for coupling communications and control signals between the charger and transceiver. A microphone, RF amplifier and mode switch are provided in the battery charger to enable two-way communications through the transceiver under control of the battery charger. The charger includes means for correspondingly controlling the operating modes of the battery charger and transceiver for transmit and receive modes in response to the state of the mode switch. An RF line is provided for coupling RF signals in both directions between the transceiver and an auxiliary antenna to which the battery charger is designed to be connected. The RF amplifier is switched into the RF line during transmit mode. The battery charger also includes means for selectively charging the transceiver battery from a source of a first voltage during transmit mode and from a source of a second, higher voltage during receive mode.

In yet another aspect, the invention provides a two-way radio system including a charging unit and a portable transceiver which is removably attachable to the charging unit. The transceiver includes a rechargeable battery, a mode control circuit, and first and second externally accessible terminals connected respectively to the battery and mode control circuit. The charging unit includes means for controlling the operating mode of the charging unit in correspondence with the operating mode of the transceiver for transmit and receive modes, including means for detecting the state of a mode switch, and means for selectively charging the battery from the source of a first voltage during the transmit mode and from the source of a second, higher voltage receive mode. The charging unit includes a charger output terminal connected to the charging circuit means and a mode control terminal connected to the mode control means, and the system includes means for electrically connecting the charger output terminal and the mode control terminal to the first and second terminals, respectively, in the transceiver.

According to yet another aspect, the invention provides a method of charging a battery in an operating transceiver. The method includes the steps of connecting a dual-mode battery charger to the transceiver battery, detecting the state of a mode switch having first and second states respectively indicative of transmit and receive modes, controlling the operating mode of the battery charger in correspondence with the operating mode of the transceiver for transmit and receive modes, and selectively charging the battery from the source of a first voltage during transmit mode and from the source of a second, higher voltage during receive mode.

A general object of the invention is to provide an improved battery charger for a transceiver.

Another object is to provide battery charging capability without sacrificing communication capability.

Yet another object of the invention is to provide an inexpensive, reliable dual-mode battery charger.

These and other objects and advantages of the invention will be apparent from the following detailed description of the preferred embodiment when taken in conjunction with the accompanying drawings.

DESCRIPTION OF THE PREFERRED EMBODIMENT

Figure 1:
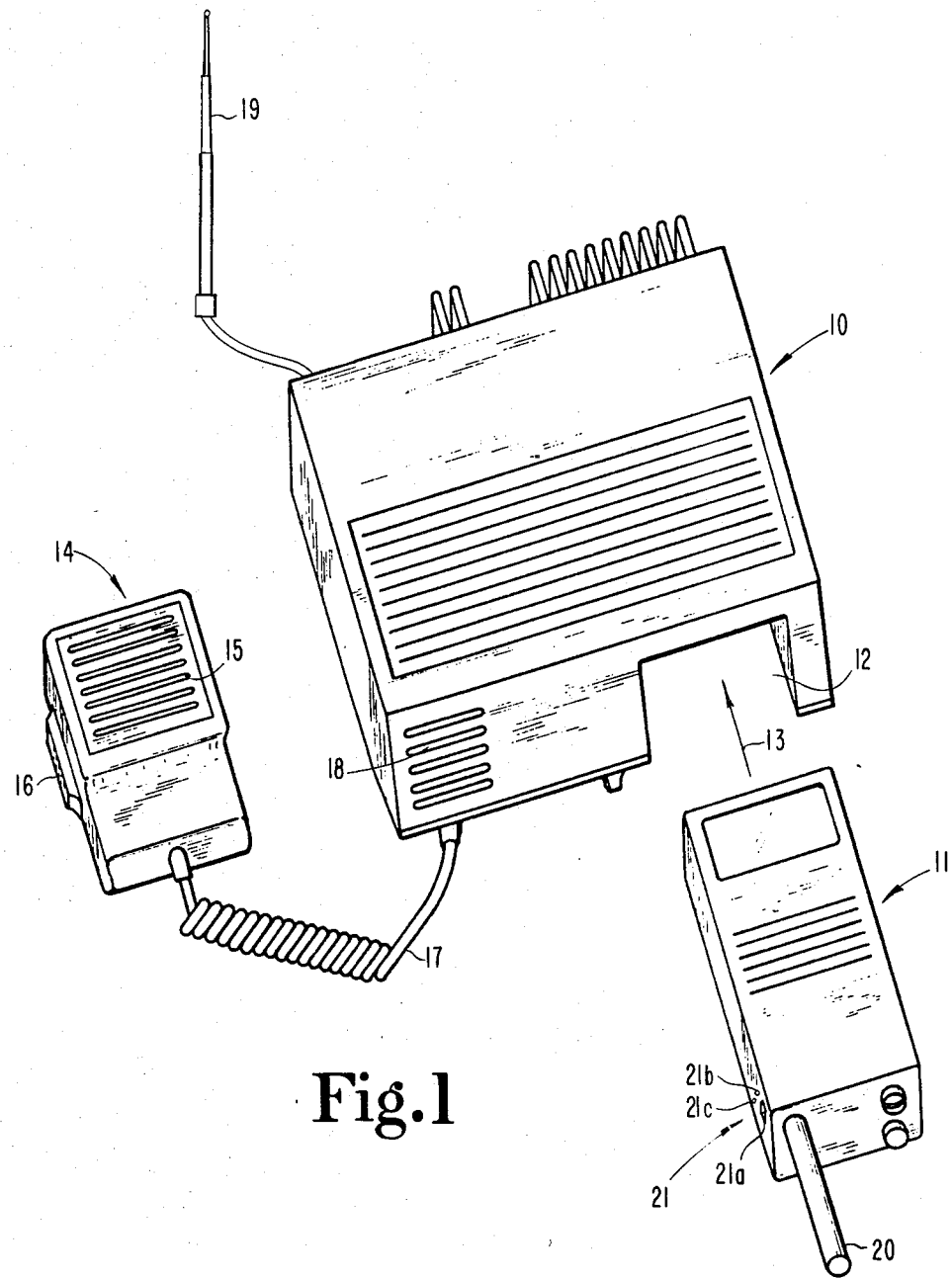
FIG. 1 is a perspective view of the preferred embodiment of a battery charger according to the present invention, shown with a transceiver usable in conjunction with the battery charger.

With reference to FIG. 1 the preferred embodiment of the invention is a charger amplifier 10 which is used in conjunction with a battery-powered, hand-held transceiver 11 for charging the transceiver battery while maintaining communications capability. Such a charger amplifier is useful with hand-held transceivers in a variety of applications, but for illustration the invention will be described with reference to a charger amplifier designed for use in a vehicle. The housing of charger amplifier 10 includes a longitudinal opening 12 into which transceiver 11 is slidably received in the direction shown by arrow 13. A latch mechanism is used for connection to the transceiver and is disclosed in my patent application entitled Mechanical Latch Mechanism for Combination Portable Transceiver and Charging Unit. The charger amplifier includes a microphone unit 14 having a microphone 15 and a push-to-talk (PTT) switch 16, the microphone unit 14 being connected to the housing of the charger amplifier by a multiwire coil cord 17. The charger amplifier includes an internal speaker 18. Antenna 19 is mounted on the vehicle in which charger amplifier 10 is mounted, and it is connected to an antenna input in the charger amplifier.

Except as will be described, transceiver 11 is a conventional transceiver having a microphone, speaker, and transmitter and receiver sections powered by a rechargeable battery, as well as various control components including a push-to-talk (PTT) switch and associated circuitry enabling transceiver 11 to transmit and receive through antenna 20. To facilitate electrical connections to the preferred embodiment of the present invention, transceiver 11 is provided with a multi-terminal connector 21 having a group of externally accessible terminals 21a in a rectangular slot provided in one side of the transceiver housing and, in separate holes, additional externally accessible terminals 21b and 21c which are connected, respectively, to a transmitter input and an RF signal line in the transceiver.

As will be understood by those skilled in the art, the drawings and the written description of the preferred embodiment include standard electrical nomenclature in references to various electrical and electronic components, including designations of resistor values in ohms and capacitor values in microfarads. It should be understood that specific component values are given for illustration of the preferred embodiment only and are not intended to define the invention or limit its scope in any way.

Figure 2:
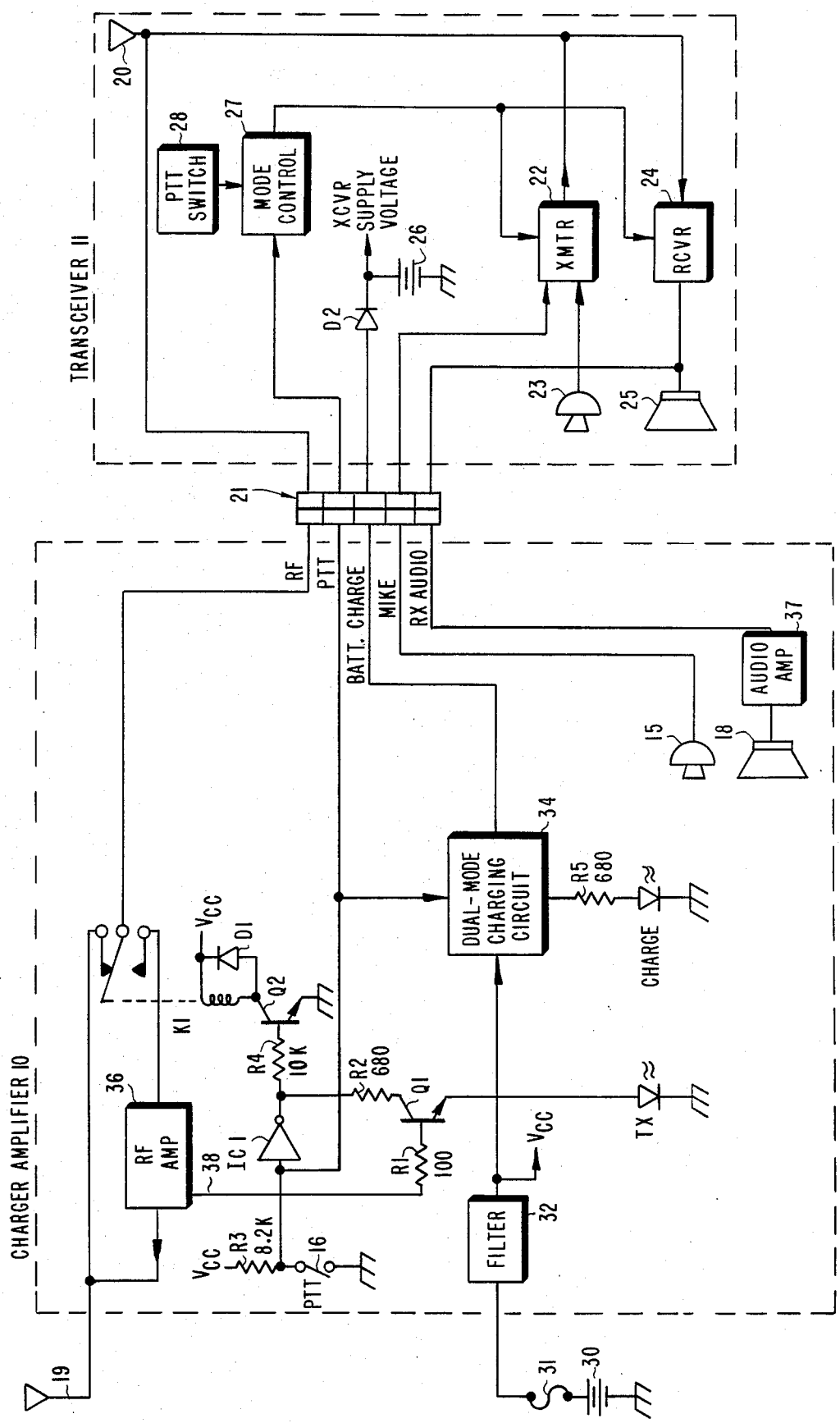
FIG. 2 is a diagram, partly in block diagram form, of the electrical circuitry in the battery charger and transceiver of FIG. 1.

Referring now to FIG. 2, the electrical circuitry for charger amplifier 10 and transceiver 11 is shown partially in block diagram form. Transceiver 11 includes a transmitter 22 and a receiver 24 which are connected respectively to a microphone 23 and a speaker 25 for normal hand-held operation when the transceiver is outside charger amplifier 10. When connector 21 is engaged, antenna 20, microphone 23 and speaker 25 are disabled by control circuitry provided in the transceiver for this purpose. Transmitter 22 includes conventional amplification and modulation circuitry including an output RF amplifier, and receiver 24 includes conventional amplificationl and demodulation circuitry including an input RF amplifier. The transmitter and receiver, which share certain circuitry such as a local oscillator, are powered by a DC battery 26 which provides power for the entire transceiver. The output of transmitter 22 and the input of receiver 24 are suitably coupled together to enable selective connection of either of them to the RF line and the associated terminal 21c in connector 21 under control of a mode control circuit 27 which responds to PTT switch 28. At least a portion of the transmitter is disabled by mode control circuit 27 during receive mode, and, similarly, at least a portion of receiver 24 is disabled during transmit mode. Transceiver 11 is provided with individual electrical connections between particular transceiver circuit sections and respective terminals in connector 21, as shown in FIG. 2.

Charger amplifier 10 includes inputs and outputs for establishing electrical connections to connector 21 of transceiver 11, to antenna 19, and to the vehicle battery 30 through a fuse 31. A conventional LC filter 32 is provided to eliminate noise on the incoming supply line from the vehicle, and the output of filter 32 is connected to all active circuits in charger amplifier 10 including a dual-mode charging circuit 34, an RF amplifier 36, an audio amplifier 37, and an integrated circuit IC1. As shown in FIG. 2, PTT switch 16 is connected between chassis ground and the input to IC1, which input is also pulled up to $V_{CC}$ through resistor R3 and connected by the PTT line to dual-mode charging circuit 34 and to the PTT terminal in the connector for transceiver 11. IC1 is depicted as an inverting logic gate for ease of illustration of its circuit function as an inverting level detector, but it is preferably a comparator circuit.

In operation, charger amplifier 10 operates in receive mode when PTT switch 16 is in its normally-open position shown in FIG. 2. In that state, the input to IC1 is pulled high through R3 whereby the output of IC1 is low, Q2 is cut off, and relay K1 is thus in the deenergized position shown in FIG. 2. Consequently antenna 19 is connected through the normally-closed contact of K1 to the RF terminal in the connector. The high-level signal on the PTT line is coupled to the PTT terminal in the connector as well as to dual-mode charging circuit 34 which, as will be described, converts the supply voltage from filter 32 up to a higher voltage and supplies that higher voltage on the BATTERY CHARGE line to transceiver 11 for charging of battery 26 through diode D2. Mode control circuit 27 is configured so as to place the transceiver in transmit mode when either PTT switch 16 or PTT switch 28 is pressed, and to otherwise maintain the transceiver in receive mode. This function may be accomplished in a number of ways, such as by connecting the two PTT switches in parallel when the transceiver is connected to the charger amplifier. PTT switch 28 is inaccessible in the preferred embodiment when transceiver 11 is mounted in charger amplifier 10, and so PTT switch 16 in the charger amplifier is used for selecting the operating modes of both the charger amplifier and the transceiver. Thus, with PTT switch 16 open, both units are in receive mode and RF signals received on antenna 19 are coupled through relay K1 along the RF line to the input of receiver 24 which is enabled at this time. The output of receiver 24 is coupled to speaker 25 and, through the RX (receive) AUDIO line, to audio amplifier 37 and speaker 18 in charger amplifier 10.

For some applications it may be desirable to design the charger housing so as to provide access to the transceiver PTT switch to enable use of that switch for selecting the operating modes of the charger amplifier and transceiver.

When PTT switch 16 is closed the input to IC1 and the PTT line are grounded, and charger amplifier 10 and transceiver 11 consequently both switch to transmit mode. In this mode, as will be described, charging circuit 34 acts as a voltage regulator. The output of IC1 is high at this time, causing Q2 to turn on through R4 and energize K1, thereby effecting a connection from the input to RF amplifier 36 through the normally-open contact of the relay to the RF line, which at this time is operatively connected to transmitter 22. A complete communication path for transmission is thus established from microphone 15 through the MIKE line, transmitter 22, the RF line, relay K1, and RF amplifier 36 to antenna 19. RF amplifier 36 generates a high-state output signal on line 38 in response to detection of a predetermined RF signal level in the RF amplifier. That signal turns Q1 on through R1, whereby turn-on current is supplied from IC1 through R2 and Q1 to the transmit (TX) LBD. Thus the TX LED gives a true indication of RF transmission. As will be explained, the CHARGE LED is used to indicate that charging circuit 34 is in receive mode and is charging the transceiver battery.

Figure 3:
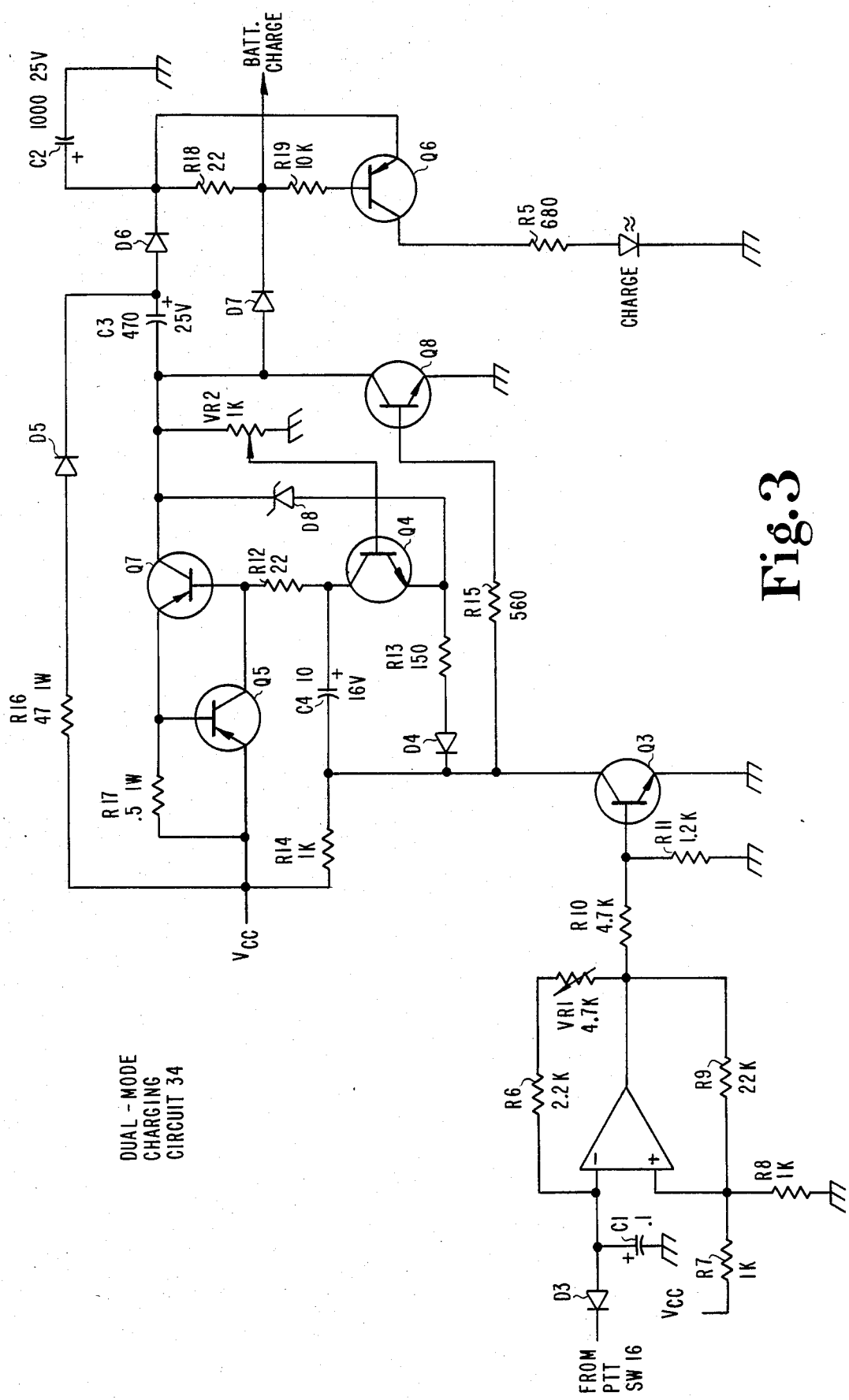
FIG. 3 is a detailed electrical schematic of the dual-mode charging circuit shown in FIG. 2.

Referring to FIG. 3, charging circuit 34 and the associated CHARGE LED circuit will now be described in detail. When transceiver 11 is connected to the battery charger, dual-mode charging circuit 34 supplies charging current on the BATTERY CHARGE line from a source of a first voltage during transmit mode and from a source of a second, higher voltage during receive mode. More specifically, charging circuit 34 operates as a voltage regulator during transmit mode and as a DC-DC converter during receive mode. Battery charging current is supplied during transmit mode from $V_{CC}$ through R17, Q7 and D7 to the BATTERY CHARGE line. In receive mode, charging circuit 34 provides battery charging current from a voltage doubler including a storage capacitor C2 and a pump capacitor C3. C2 has a discharge path through R18 to the BATTERY CHARGE line, a first charging path from $V_{CC}$ through R16, D5 and D6, and a second charging path from $V_{CC}$ through R17, Q7, C3 and D6. Pump capacitor C3 is charged from $V_{CC}$ through R16, D5 and Q8.

The mode of operation of charging circuit 34 is controlled by the signal level on the cathode of D3 which is connected to PTT switch 16 and the PTT line in charger amplifier 10. Diode D3 connects the PTT line to an oscillator composed of an operational amplifier IC2 and associated resistors R6–R9, potentiometer VR1 and capacitor C1. When the PTT line is high, D3 is cut off and the oscillator generates a square-wave signal at the output of IC2 having a frequency of approximately 20 KHz. The square-wave signal is coupled to the base of Q3 through R1 thereby cyclically switching that transistor on and off.

During the oscillator half-cycle in which Q3 is off, Q8 is turned on by base current flowing from $V_{CC}$ through R14 and R15. At this time the cathode of C3 is grounded through Q8 thereby completing the charging circuit for that capacitor from $V_{CC}$ through R16, D5 and Q8. When electrical power is initially applied to the charger amplifier, C4 is fully discharged and, therefore, base current flows out of Q7 through R12 and C4 to R15 and therethrough to the base of Q8. Q4 is cut off at this time because VR2 is shorted out by Q8 and the junction of R14 and R15 is, due to Q8 base current, above ground potential. The base current in Q7 causes it to conduct current from $V_{CC}$ to ground through R17 and Q8. Q5 and R17 cooperate with Q7 to limit the collector current of Q7. C2 is also fully discharged when the charger amplifier is initially turned on. Accordingly, D6 is forward biased whereby C2 and C3 are connected substantially in parallel for initial charging. As will be described, C4 charges during receive mode to a level at which Q7 is cut off during the half-cycle that Q8 is on. During the oscillator half-cycle in which Q3 is on, Q8 is cut off and base current flows out of Q7 through R12 and through the series-parallel circuit formed by C4, Q4, R13 and D4. As a result, Q7 conducts and the anode voltage of C3 rises virtually instantaneously to a value equal to the sum of the voltage across C3 and the collector voltage of Q7. The sum voltage is greater than the voltage on C2, thus D6 is forward biased and a series circuit is thereby completed from $V_{CC}$ through R17, Q7, C3, D6, and C2. C3 then begins to discharge into C2. The charge on C3 is only partially transferred to C2 during any one half-cycle, but on subsequent half-cycles C3 charges toward the battery voltage $V_{CC}$ from successively higher initial values whereby, due to successive series connections of C3 and C2, C2 is effectively "pumped" up to a voltage approximately twice the battery voltage. C2 supplies a charging current to the transceiver battery determined by the instantaneous terminal voltage and internal resistance of the battery.

The series circuit formed by Q4, R13 and D4 provides a discharge path for C4 when Q3 is on. Consequently C4 charges during receive mode to a steady-state voltage, determined primarily by R12 and R13, which is higher than the voltage drop across R14 due to Q8 base current when Q3 is off. Thereafter, when Q3 turns off, the anode voltage of C4 rises to a level higher than $V_{CC}$ thereby cutting off Q7.

In receive mode the voltage on the anode of C2, which is also the emitter voltage of Q6, is greater than the voltage on the BATTERY CHARGE line whenever current is being drawn by transceiver 11, due to the voltage drop across R18. These conditions cause base current to flow out of transistor Q6 and through R19 thereby turning Q6 on and energizing the CHARGE LED. The CHARGE LED thus indicates that the transceiver battery is charging in receive mode. Such a circuit arrangement for a charge light is advantageous in that it provides an actual indication of an output current from the charging circuit, rather than merely indicating a sufficient output voltage level for the charging circuit.

In transmit mode the inverting input of IC2 is effectively grounded through D3 by the ground level input on the cathode of the diode. Consequently the output of IC2 goes high and transistor Q3 turns on. Q8 is cut off at this time and the voltage doubler is thereby disabled. That is, C3 discharges through D6 and R18 into the transceiver circuitry and is not recharged, and C2 consequently discharges through R18 down to a level less than VCC. Current is supplied to the BATTERY CHARGE line through R17, Q7 and D7 at a voltage regulated by potentiometer VR2 in cooperation with zener diode D8. This configuration enables delivery of sufficient current for operation of transmitter 22 without substantial drain on the transceiver battery. Q6 is cut off because the voltage on C2 is no greater than the voltage on the BATTERY CHARGE line, and, therefore, the CHARGE LED is off.

While there has been described above the principles of this invention in connection with specific apparatus, it is to be understood that this description is made only by way of example and not as a limitation to the scope of the invention.

What is claimed is:

1. A battery charger for a hand-held transceiver having a rechargeable battery, comprising:
   a housing having means for receiving the transceiver;
   connector means for electrically connecting said battery charger to the transceiver, said connector means including a microphone terminal, an RF terminal, a mode control terminal and a charger output terminal;
   a microphone unit having a microphone and a mode switch, said microphone being electrically coupled to said microphone terminal;
   multiwire cable means for attaching said microphone unit to said housing;
   an RF amplifier having an input and an output;
   an antenna lead connected to said RF amplifier output;
   mode control means for correspondingly controlling the operating modes of said battery charger and the transceiver for transmit and receive modes, said mode control means having an input connected to said mode switch and an output connected to said mode control terminal;
   means responsive to said mode control means for coupling said RF terminal to said RF amplifier input during transmit mode and to said antenna lead during receive mode; and
   charging circuit means for selectively charging the transceiver battery from a source of a first voltage during transmit mode and from a source of a second, higher voltage during receive mode, said charging circuit means having an output connected to said charger output terminal.

2. The battery charger of claim 1 wherein said source of said first voltage includes a voltage regulator operative during transmit mode, and wherein said source of said second voltage includes a DC-DC converter operative during receive mode, said voltage regulator and said DC-DC converter having a common output terminal and a common transistor.

3. The battery charger of claim 2 wherein said DC-DC converter has a storage capacitor, a pump capacitor, means for charging said pump capacitor from a DC source, means for transferring charge from said pump capacitor to said storage capacitor, said charge transferring means including means for selectively connecting said pump capacitor in series with the DC source and said storage capacitor, and oscillator means for alternately activating said pump capacitor charging means and said charge transferring means.

4. The battery charger of claim 3 wherein said oscillator means includes an oscillator operative during receive mode to generate a square-wave output signal a first state of which activates said common transistor, said battery charger further comprising:
   means for locking said oscillator in said first state during transmit mode.

5. The battery charger of claim 1 wherein said source of said second voltage includes a DC-DC converter having a storage capacitor, a pump capacitor, means for charging said pump capacitor from a DC source, means for transferring charge from said pump capacitor to said storage capacitor, said charge transferring means including means for selectively connecting said pump capacitor in series with the DC source and said storage capacitor, and oscillator means for alternately activating said pump capacitor charging means and said charge transferring means.

6. The battery charger of claim 5 wherein said oscillator means includes an oscillator operative during receive mode to generate a square-wave output signal a first state of which activates said common transistor, said battery charger further comprising:
   means for locking said oscillator in said first state during transmit mode whereby said DC-DC converter is rendered inoperative.

7. A battery charger for a hand-held transceiver having a rechargeable battery, comprising:
   mode control means for controlling the operating mode of said battery charger in correspondence with the operating mode of the transceiver for transmit and receive modes, said mode control means including means for detecting the state of a mode switch; and
   charging circuit means for selectively charging the transceiver battery from a source of a first voltage during transmit mode and from a source of a second, higher voltage during receive mode.

8. The battery charger of claim 7 wherein said charging circuit means includes means for generating said first and second voltages from a DC source voltage, and wherein said source of said second voltage includes a DC-DC converter.

9. The battery charger of claim 8, further comprising:
   a housing having means for receiving the transceiver, said housing containing said mode control means and said charging circuit means;
   a mode switch coupled to said detecting means in said mode control means; and
   first connector means for electrically connecting said mode control means and said charging circuit means to a mode control circuit and the battery, respectively, in the transceiver received by said housing.

10. The battery charger of claim 9, further comprising;
    a microphone unit including a microphone and said mode switch;
    multiwire cable means for attaching said microphone unit to said housing;
    an RF amplifier having an input and an output;
    an antenna lead connected to said RF amplifier output;
    second connector means for electrically connecting said battery charger to the transceiver, said second connector means including a microphone terminal coupled to said microphone and further including an RF terminal; and
    means responsive to said mode control means for coupling said RF terminal to said RF amplifier input during transmit mode and to said antenna lead during receive mode.

11. The battery charger of claim 10 wherein said source of said first voltage includes a voltage regulator operative during transmit mode, and wherein said DC-DC converter includes a voltage doubler operative during receive mode, said voltage regulator and said voltage doubler having a common output terminal and a common transistor.

12. The battery charger of claim 11 wherein said voltage doubler has a storage capacitor, a pump capacitor, means for charging said pump capacitor from the DC source, means for transferring charge from said pump capacitor to said storage capacitor, said charge transferring means including means for selectively connecting said pump capacitor in series with the DC source and said storage capacitor, and oscillator means for alternately activating said pump capacitor charging means and said charge transferring means.

13. The battery charger of claim 12 wherein said oscillator means includes an oscillator operative during receive mode to generate a square-wave output signal a first state of which activates said common transistor, said battery charger further comprising:
means for locking said oscillator in said first state during transmit mode whereby said voltage doubler is rendered inoperative.

14. The battery charger of claim 7, further comprising:
a housing having means for receiving the transceiver, said housing containing said mode control means and said charging circuit means;
a mode switch coupled to said detecting means in said mode control means; and
first connector means for electrically connecting said mode control means and said charging circuit means to a mode control circuit and the battery, respectively, in the transceiver received by said housing.

15. The battery charger of claim 7, further comprising;
a housing;
a microphone unit including a microphone and a mode switch;
multiwire cable means for attaching said microphone unit to said housing;
an RF amplifier having an input and an output;
an antenna lead connected to said RF amplifier output;
connector means for electrically connecting said battery charger to the transceiver, said connector means including a microphone terminal coupled to said microphone and further including an RF terminal; and
means responsive to said mode control means for coupling said RF terminal to said RF amplifier input during transmit mode and to said antenna lead during receive mode.

16. The battery charger of claim 7 wherein said source of said first voltage includes a voltage regulator operative during transmit mode, and wherein said source of said second voltage includes a voltage doubler operative during receive mode, said voltage regulator and said voltage doubler having a common output terminal and a common transistor.

17. The battery charger of claim 7 wherein said source of said second voltage includes a voltage doubler having a storage capacitor, a pump capacitor, means for charging said pump capacitor from a DC source, means for transferring charge from said pump capacitor to said storage capacitor, said charge transferring means including means for selectively connecting said pump capacitor in series with the DC source and said storage capacitor, and oscillator means for alternately activating said pump capacitor charging means and said charge transferring means.

18. The battery charger of claim 17 wherein said oscillator means includes an oscillator operative during receive mode to generate a square-wave output signal a first state of which activates said common transistor, said battery charger further comprising:
means for locking said oscillator in said first state during transmit mode whereby said voltage doubler is rendered inoperative.

19. A two-way radio system, comprising a charging unit, a portable transceiver, and means for removably attaching said transceiver to said charging unit,
said transceiver including
a rechargeable battery;
a transceiver mode control circuit; and
first and second externally accessible terminals connected respectively to said rechargeable battery and said transceiver mode control circuit;
said charging unit including
mode control means for controlling the operating mode of said charging unit in correspondence with the operating mode of said transceiver for transmit and receive modes, said mode control means including means for detecting the state of a mode switch;
charging circuit means for selectively charging said transceiver battery from a source of a first voltage during transmit mode and from a source of a second, higher voltage during receive mode;
a charger output terminal connected to an output of said charging circuit means; and
a mode control terminal connected to said mode control means; and
said attaching means including first connector means for electrically connecting said charger output terminal and said mode control terminal to said first and second terminals, respectively.

20. The two-way radio system of claim 19 wherein said transceiver further includes
an RF junction between the transceiver transmitter and receiver;
a third externally accessible terminal connected to said RF junction;
a fourth externally accessible terminal connected to an input of the transceiver transmitter;
wherein said charging unit further includes
a housing;
a microphone unit including a microphone and a mode switch;
multiwire cable means for attaching said microphone unit to said housing;
a microphone terminal electrically coupled to said microphone;
an RF amplifier having an input and an output;
an RF terminal;
an antenna lead connected to said RF amplifier output; and
means responsive to said mode control means for coupling said RF terminal to said RF amplifier input during transmit mode and to said antenna lead during receive mode;
and wherein said attaching means includes second connector means for electrically connecting said RF terminal and said microphone terminal to said third and fourth terminals, respectively.

21. The two-way radio system of claim 19 wherein said source of said first voltage includes a voltage regulator operative during transmit mode, and wherein said source of said second voltage includes a DC-DC converter operative during receive mode, said voltage regulator and said DC-DC converter having a common output terminal and a common transistor.

22. The two-way radio system of claim 19 wherein said source of said second voltage includes a DC-DC converter having a storage capacitor, a pump capacitor, means for charging said pump capacitor from a DC source, means for transferring charge from said pump capacitor to said storage capacitor, said charge transferring means including means for selectively connecting said pump capacitor in series with the DC source and said storage capacitor, and oscillator means for alternately activating said pump capacitor charging means and said charge transferring means.

23. The two-way radio system of claim 22 wherein said oscillator means includes an oscillator operative during receive mode to generate a square-wave output signal a first state of which activates said common transistor, and wherein said charging circuit means further includes means for locking said oscillator in said first state during transmit mode whereby said DC-DC converter is rendered inoperative.

24. The two-way radio system of claim 19 wherein said charging unit further includes a housing having means for receiving said transceiver; and a mode switch coupled to said detecting means in said mode control means.

25. A method of charging a battery in an operating transceiver, comprising the steps:

connecting a dual-mode battery charger to the transceiver battery;

detecting the state of a mode switch having first and second states respectively indicative of transmit and receive modes;

controlling the operating mode of said battery charger in correspondence with the operating mode of said transceiver for transmit and receive modes; and selectively charging said transceiver battery from a source of a first voltage during transmit mode and from a source of a second, higher voltage during receive mode.

26. The method of claim 25, further comprising the step:

generating said first and second voltages from a DC source voltage, said generating step including generating said second voltage with a DC-DC converter.

27. The method of claim 26 wherein said step of generating said second voltage includes cyclically charging a pump capacitor from said DC source and then transferring charge from said pump capacitor to a storage capacitor connected to the output of said source of said second voltage, said transferring step including connecting said pump capacitor in series with said DC source and said storage capacitor.

* * * * *

UNITED STATES PATENT AND TRADEMARK OFFICE
CERTIFICATE OF CORRECTION

PATENT NO. : 4,684,870

DATED : August 4, 1987

INVENTOR(S) : David L. George et al.

It is certified that error appears in the above-identified patent and that said. Letters Patent is hereby corrected as shown below:

In column 3, line 19, please insert --, Serial No. 849,766, filed April 9, 1986-- after "Unit".
In column 3, line 65, please change "amplificationl" to --amplification--.
In column 5, line 19, please change "LBD" to --LED--.
In column 5, line 54, please change "R1" to --R10--.

Signed and Sealed this

Fifteenth Day of December, 1987

Attest:

DONALD J. QUIGG

Attesting Officer   Commissioner of Patents and Trademarks